L. HOLLER.
BOLT.
APPLICATION FILED OCT. 28, 1911.

1,055,174.

Patented Mar. 4, 1913.

Inventor
Laurence Holler,

Witnesses
Carroll Bailey
Wm B North

By Victor J. Evans
Attorney

UNITED STATES PATENT OFFICE.

LAURENCE HOLLER, OF MONTEZUMA, COLORADO.

BOLT.

1,055,174. Specification of Letters Patent. Patented Mar. 4, 1913.

Application filed October 28, 1911. Serial No. 657,244.

*To all whom it may concern:*

Be it known that I, LAURENCE HOLLER, a citizen of the United States, residing at Montezuma, in the county of Summit and State of Colorado, have invented new and useful Improvements in Bolts, of which the following is a specification.

This invention relates to improvements in bolts.

In carrying out my invention it is my purpose to provide a bolt especially adapted for use for securing flights or buckets to conveyer belts and one wherein the necessity of punching or cutting the belt for the reception of the bolt is entirely obviated.

I also aim to provide a bolt of this class which may be readily forced through the belt of the conveyers, thereby bracing the material of which the belt is formed and avoiding the danger of weakening said belt, incident to cutting or perforating the same.

With the above, and other objects in view, the nature of which will be disclosed as the description of the invention progresses, the invention resides in the novel construction of bolts for securing flights or buckets to conveyer belts as will hereinafter be more fully described and claimed.

Figure 1:
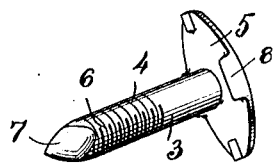
Figure 2:
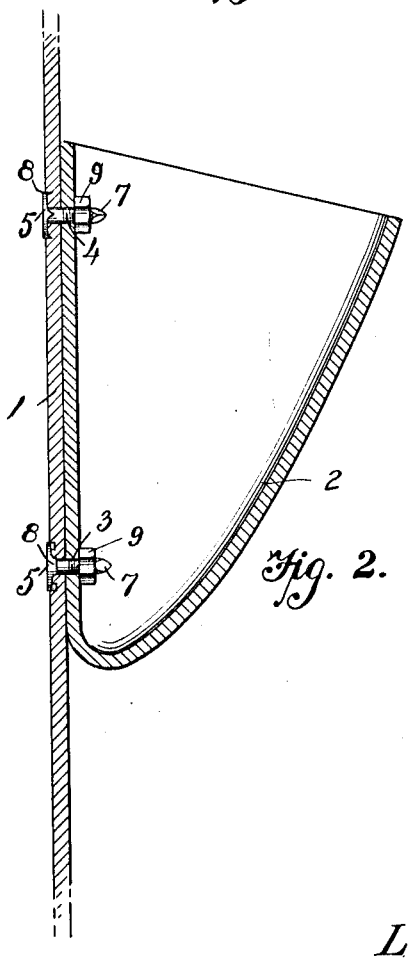

In the drawings, Figure 1 is a perspective view of the bolt constructed in accordance with the present invention. Fig. 2 is a sectional view through the belt or conveyer, showing the bolt in its applied position thereon and securing thereto a bucket or flight.

In the well known manner of connecting flights or buckets to conveyers, a hole is made in the belt by cutting or punching a part of the belt, this hole is for the reception of an ordinary bolt and it is obvious that by thus cutting away the belt, it is weakened at these particular points and as a consequence easily severed when under a strain. This requires the mending of the belt which, of course, requires quite an amount of time and labor, not to speak of the time and expense occasioned by the non-working of the belt.

It is the primary object of the present invention to provide a bolt having a sharpened or V-shaped edge, and also provided with a head formed with biting teeth the sharpened terminal of the bolt being readily forced through the belt which compresses the portion of the belt surrounding the bolt, and which, instead of weakening the belt, adds to the strength thereof.

Referring now to the drawings in detail, the numeral 1 designates an ordinary conveyer belt, and 2 the bucket or flight to be connected with the belt.

The numeral 3 designates my improved bolt. This bolt embodies a shank 4, and a head 5. The shank 4 is rounded in cross section and is provided with threads 6. The end of the shank opposite its head 5 is beveled in opposite directions to provide a sharpened extremity 7. The head 5 is formed upon its inner face with a plurality of integrally formed teeth 8. By reference to Fig. 2 of the drawings it will be noted that one pair of diametrically opposed teeth 8 are of a width greater than that of the shank, while the remaining teeth are smaller but have their biting edges arranged in parallel planes with the first named teeth. It will be further noted by reference to Fig. 1 of the drawing, a pair of the teeth 8 are arranged in alinement with the beveled portions of the shank terminal, and have a length exceeding the diametrical extent of the said shank. After the shank is inserted through the belt and the teeth of the head thereof engage the said belt, a nut 9 is screwed upon the threaded portion 6 of the shank the flight being arranged between the said nut and the conveyer belt.

Having thus described the invention what I claim is:—

1. A bolt for conveyer belts, comprising a threaded shank, having a sharpened terminal and an enlarged head disposed at right angles to the shank, said head being formed with sets of diametrically opposed teeth having biting edges, the biting edges of all of said teeth being arranged in parallel planes, and one pair of such teeth being of materially greater length than the remaining teeth.

2. A bolt for conveyer belts, comprising a shank having diametrically opposed portions thereof cut away to form a beveled sharpened terminal, and a head formed integrally with the opposing end of the shank and provided with teeth having biting edges, said teeth being arranged in diametrically opposed pairs with their biting edges in parallelism, that pair of teeth in alinement with the beveled portions of the shank terminal having a length exceeding the diametrical extent of said shank.

In testimony whereof I affix my signature in presence of two witnesses.

LAURENCE HOLLER.

Witnesses:
F. E. KIRTS,
GEO. WILLIAMS.